April 24, 1951 F. H. FRANTZ 2,550,640

LIGHT PRINTING MEANS

Filed Feb. 26, 1943 7 Sheets-Sheet 1

INVENTOR
Frederick H. Frantz
BY [signature]
[signature]
ATTORNEY

April 24, 1951 F. H. FRANTZ 2,550,640

LIGHT PRINTING MEANS

Filed Feb. 26, 1948 7 Sheets-Sheet 2

INVENTOR
Frederick H. Frantz

BY [signature] [signature]
ATTORNEY

April 24, 1951 F. H. FRANTZ 2,550,640

LIGHT PRINTING MEANS

Filed Feb. 26, 1943 7 Sheets-Sheet 3

INVENTOR
Frederick H. Frantz
BY [signature]
[signature]
ATTORNEY

INVENTOR
Frederick H. Frantz
BY Henry M. Lugli
Rodney C. Southworth
ATTORNEY

April 24, 1951 F. H. FRANTZ 2,550,640

LIGHT PRINTING MEANS

Filed Feb. 26, 1943 7 Sheets-Sheet 5

INVENTOR
Frederick H. Frantz
BY [signature]
[signature]
ATTORNEY

April 24, 1951 F. H. FRANTZ 2,550,640

LIGHT PRINTING MEANS

Filed Feb. 26, 1948 7 Sheets-Sheet 6

INVENTOR
Frederick H. Frantz
BY
ATTORNEY

INVENTOR
Frederick H. Frantz
BY [signature]
[signature]
ATTORNEY

Patented Apr. 24, 1951

2,550,640

UNITED STATES PATENT OFFICE 2,550,640

LIGHT PRINTING MEANS

Frederick H. Frantz, Binghamton, N. Y., assignor to General Aniline & Film Corporation, New York, N. Y., a corporation of Delaware Application February 26, 1948, Serial No. 11,013

17 Claims. (Cl. 95—73)

This invention relates to light printing machines, and more specifically, to a light sensitive material printing machine adapted to operate with diazo-coated light sensitive materials and to print original patterns on relatively long lengths of the said material.

It is a general object of the invention to devise a more or less automatic light printing apparatus for printing over extensive areas of relatively long lengths of sensitized layers, such as diazo-coated material, a design or pattern which may be repeated along the length of the material or which may take any desired configuration or form.

Another object of the invention is to provide a machine for printing patterns such as those employed in the fabric cutting industries, wall papers or photo-murals and various types of templates, either on diazo-coated materials or on other materials sensitive to light and which may after printing be developed or otherwise processed to produce a permanent image.

A further object of the invention is to devise a machine for printing relatively long lengths of wide sensitized material in registry with an original or a great plurality of originals and to print progressively along the length of said sensitized material while maintaining the material in flattened condition against a support and further maintaining the original or originals in similar flattened condition and in contact with the sensitized material at the area where light printing is accomplished during the progression of the machine over the entire length of the material.

A further object of the invention is to provide mechanism of the type described which shall function at a relatively high speed and in which there shall be efficient use of standard printing lights.

A further object is to devise a machine of the type described in which the printing mechanism shall automatically be stopped when it has reached the end of a predetermined length of sensitized material, and thereafter be returned by power and without effect upon the sensitized material or originals being printed, to its first or starting position.

Other objects of the invention include safety features hereinafter to be described and various refinements of control whereby the printer may be handled by unskilled operators.

In addition, the invention is directed toward devising mechanism which may be permitted to operate in substantially automatic manner once it has been started, or which may be positively controlled throughout its cycle of operation so as to stop and start or to return to initial position at the will of the operator.

It is a further object to provide a mechanism of the type described in which the original to be printed may comprise individual master patterns such as are employed in the textile cutting industries, or a continuous pattern or any other design in the nature of an original opaque or light transmitting medium which may be placed upon the sensitized material. It is also an object of the invention to incorporate the original from which the printed image is determined as an integral and functional part of the printing device itself.

Other objects of the invention will become apparent from the following more detailed description.

In certain industries, the problem arises of printing relatively long or extensive areas of light sensitive material, the extent of such areas being far too great to be exposed by any reasonably sized light source at one instant. During such printing, it is also a further requisite that the original design or pattern or the like to be printed, be laid upon or brought into registry with the sensitized material throughout its complete extent before starting the printing. One such problem arises in producing patterns for the textile cutting industries where a relatively great number of independent patterns are laid upon a sheet of sensitized material which is then subjected to light so as to form a latent image. Thereafter the sensitized material may be developed or otherwise processed in an appropriate manner so as to render permanent the series of pattern images thereon.

According to one practice, the original or first printing of these patterns which are separately positioned on the sensitized material is for the purpose of obtaining a master copy from which any desired number of repeats may be printed. It is the primary purpose of the instant invention as above described, to provide for rapid and effective printing of such master copies.

The invention is by no means limited to producing photographically such patterns as are employed in the textile cutting industries, but the mechanism herein described and claimed is equally adapted to many other purposes, for example, printing repeating patterns along relatively great lengths of sensitized material for the purpose of manufacturing wall papers, other ornamentally figured papers or fabrics, photostatic designs, photomurals on any type of sensitized sheet material, or templates such as may be used in sheet metal work in the aircraft industry or for similar problems. In fact, the purposes to which such mechanisms may be put are so numerous that it is impossible to list them all here and, of course, a complete list would serve no useful purpose at this time.

Heretofore, sensitized material has been printed to produce master pattern sheets by travelling mechanisms including a carriage movable along an extended table upon which the sensitized material and patterns have been laid. This travelling carriage contained a suitable light source for irradiating the sensitized layer and was movable over the original patterns. It also utilized an endless belt of relatively transparent material such as any one of the optically clear, relatively flexible plastics, in contact with the original patterns.

The above conventional printing arrangement has serious disadvantages which are pointed out in detail below. The present invention is directed to improvements for overcoming these disadvantages, and particularly to insure more intimate contact between the original patterns and the sensitized material and to hold them in absolutely flat condition while they are subjected to the printing light. A flexible travelling belt, as used heretofore must be relatively thin in order to provide sufficient flexibility and translucency and is, therefore, ineffective in maintaining firm contact so as to hold the originals and the sensitized material in the proper printing plane.

Lack of firm contact with the sensitized material and any slight movement of the originals while subjected to the light results in indistinct or raggedly defined edges. Such reproduction of the particular pattern or other printed image is either unsatisfactory or at least, highly undesirable for its intended purpose. Moreover, the effect of the heat from the light source on the plastic belt frequently causes buckling and lessening of tension.

In overcoming the above-mentioned objectionable features, the present printing apparatus employs a travelling carriage which moves over a support in the form of a table or other sensitized material sustaining element. It is power driven at a rate consistent with the printing speed of the sensitized material and of the light source which is preferably a high intensity mercury vapor lamp, or a plurality of such lamps, the radiation from which is relatively rich in the ultraviolet region. The carriage movable over the support for the sensitized material and original patterns to be printed is positively advanced and is automatically controlled so that the operator thereof has merely to start the mechanism from the starting end of the supporting table and after it has stopped at the opposite end thereof, to actuate the proper controls incidental to returning the carriage to its initial position in readiness for repeating the printing operation.

In order to maintain solid contact between the original material to be printed and the sensitized layer and to maintain both in flattened condition while subjected to the printing light, a plurality of sequentially movable, flat, translucent pressure members are operatively associated with the travelling carriage. These pressure members, which may number three or more, comprise flat, glass plates or other translucent or transparent materials not deformable under heat from an intense light source, and adapted to transmit a relatively great proportion of violet and ultraviolet light. Each said transparent plate is provided with retaining side members by which it may be lifted by driven chains or other appropriate means and controlled so that these pressure members are progressively "stepped" along the length of the material to be printed by lifting the rearmost member from its contact with the material to be printed and moving it forwardly to a position in front of the foremost member. The term "stepped" has been employed since there are always one or more of the pressure members left freely resting in contact with the material to be printed and the movement just mentioned and hereinafter to be described in detail is of such character as successive stepping of feet would signify. The "material to be printed" or "printing material" is frequently used to denote either or both the original and the sensitized layers.

This successive stepping or periodic advancing of the pressure members is synchronized so that there will always be at least one and preferably two members overlying the material to be printed at that portion then being subjected to the printing light. The said pressure members are lowered into position onto the printing material with only a slight clearance between the trailing edge of the foremost member and the leading edge of that next following. In raising the rearmost member, it is not essential that particular care be exercised in the method by which it is to be withdrawn from the material to be printed since the light has then passed the sensitized layer covered by the rearmost pressure member and the latent image is complete. However, in placing or "laying down" the front pressure member, a particular movement is desirable. As will hereinafter be described in greater detail, the front member is lowered into contact with the material to be printed by a movement virtually perpendicular to the material and with no tendency to turn the edges of the patterns or other originals to be printed or to move this material longitudinally relative to the sensitized layer beneath it and thereby dislodge the pattern from its original position.

The movement of the pressure members and particularly the lowering of the foremost member is very desirable and, in fact, is one of the salient features of this invention. It is to avoid shifting of the material to be printed relatively to the sensitized layer since the patterns to be printed have been placed very carefully in advance of starting the machine.

When the device has reached the terminal end of the supporting table or other supporting member, it is automatically brought to a stop and all functions are discontinued pending its return to the initial or starting end of the support. Preferably, the mechanism is always stopped in one particular position. The return is effected by raising the entire carriage and, incidentally, those pressure members which may then be reposing freely on the material to be printed, and then returning the mechanism along the table, either manually since the driving mechanism will have been disconnected incidental to the raising of the carriage, or, if desired, by power.

The invention will be described hereinafter by reference to one specific embodiment thereof as exemplified in the accompanying figures of drawing, wherein identical numerals are applied to like parts, and in which.

Figure 1:
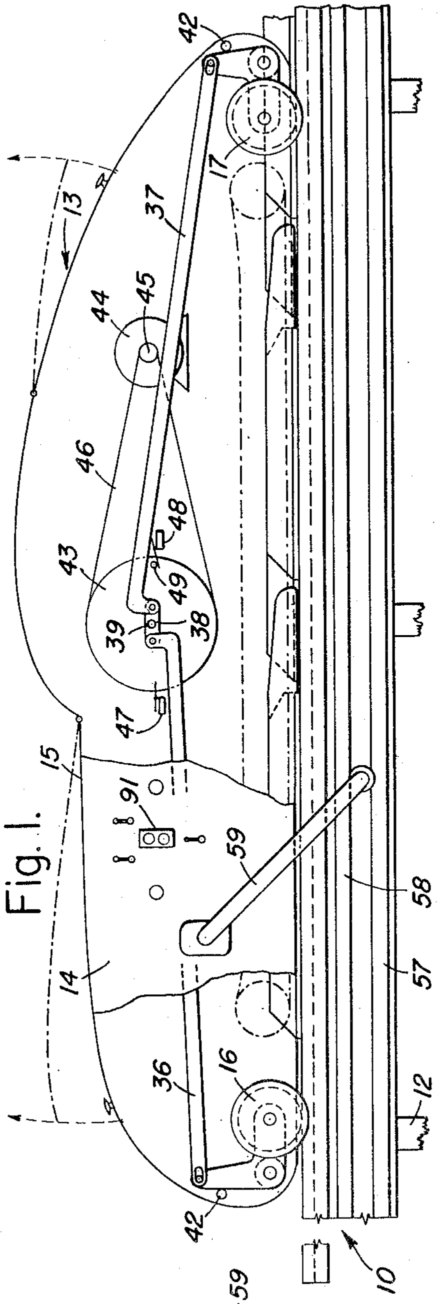
Fig. 1 is a partial longitudinal section showing certain parts of the carriage mounted in position on the support for the material to be printed.
Figure 2:
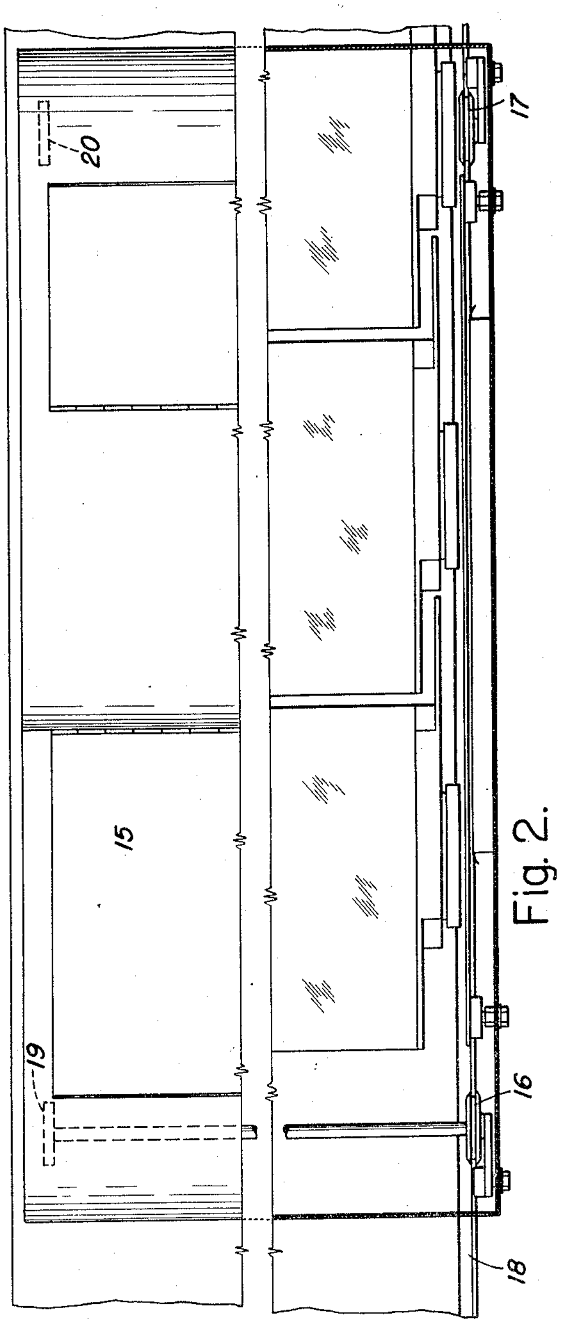
Fig. 2 is a partial plan view of certain of the mechanism of Fig. 1.
Figure 3:
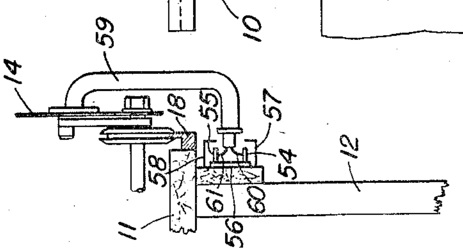
Fig. 3 is a section taken through a portion of the support for the carriage and showing details of the current pick-up at one side of the device.

Now referring to Figs. 1, 2, and 3, the printing mechanism comprises among other elements a supporting table generally indicated by numeral 10 having a flat top portion 11 supported at appropriate intervals by legs 12. This supporting table may be of any convenient length depending upon the particular installation, and for most purposes, its length is only limited by the space available. The printing mechanism itself including printing lamps and other elements is either carried by or movable with a carriage generally designated by numeral 13 and having side members 14 over and between which extends a closure completing cover member 15. This cover member 15 is preferably provided at its front and rear portions with doors which open to provide access to the mechanism enclosed within the carriage casing.

The carriage is adapted to be moved along the supporting table on four or more rollers, two at one side of the carriage indicated by numerals 16 and 17 being grooved as shown in these figures for engagement with a flange or track member 18, by which the carriage is laterally positioned with respect to the table and caused to progress in parallelism with the direction of the table. At the opposite side, the rollers 19 and 20 serve to support the structure, but otherwise merely roll along the flat surface of the table. Obviously, all the supporting rollers might be grooved as are those at one side and a duplicate track provided at the right-hand side of the supporting table, if desired.

Figure 4:
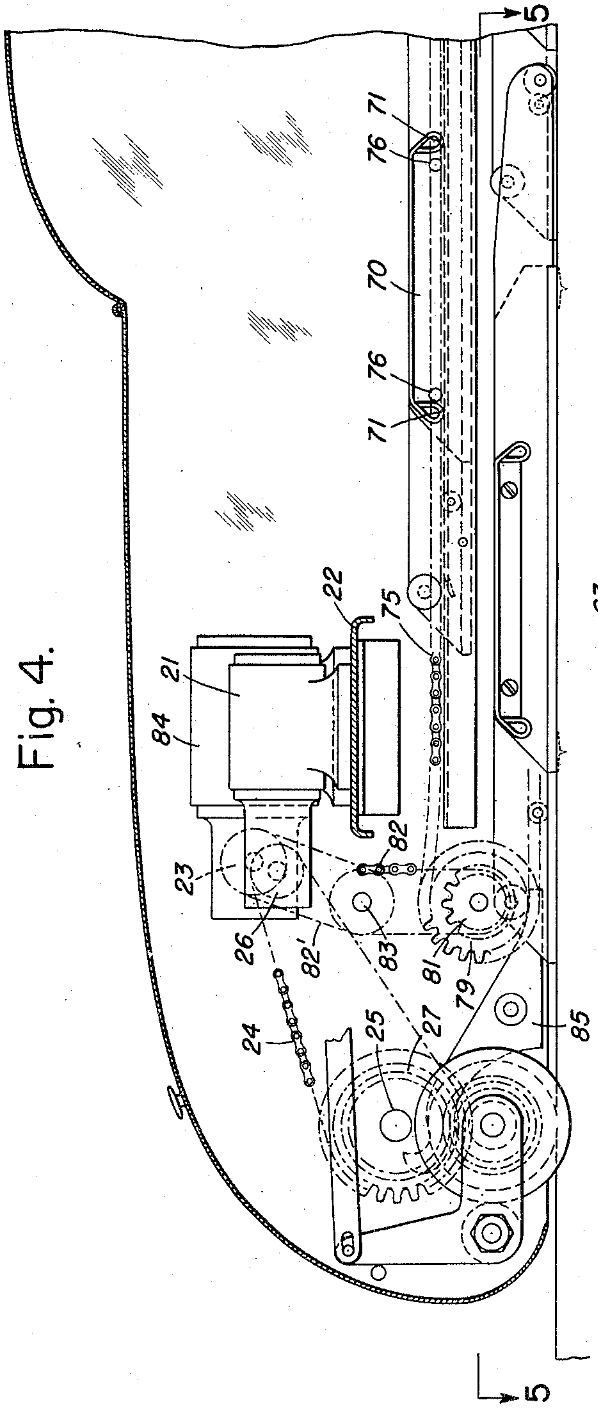
Fig. 4 is a section taken through the forward part of the carriage illustrating the driving means for both the carriage and the pressure member controlling chains.
Figure 5:
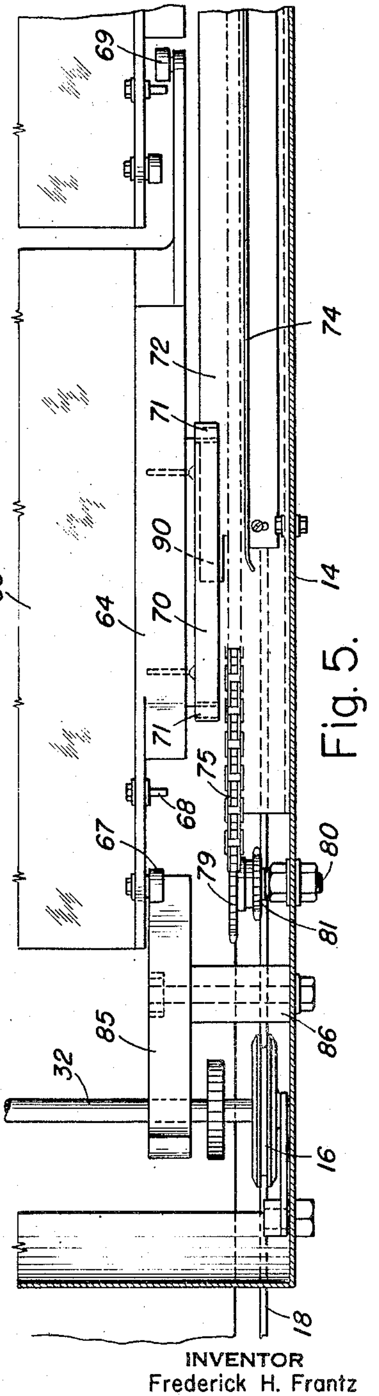
Fig. 5 is a section at one side of the front portion of the carriage as taken at line 5—5, Fig. 4.
Figure 8:
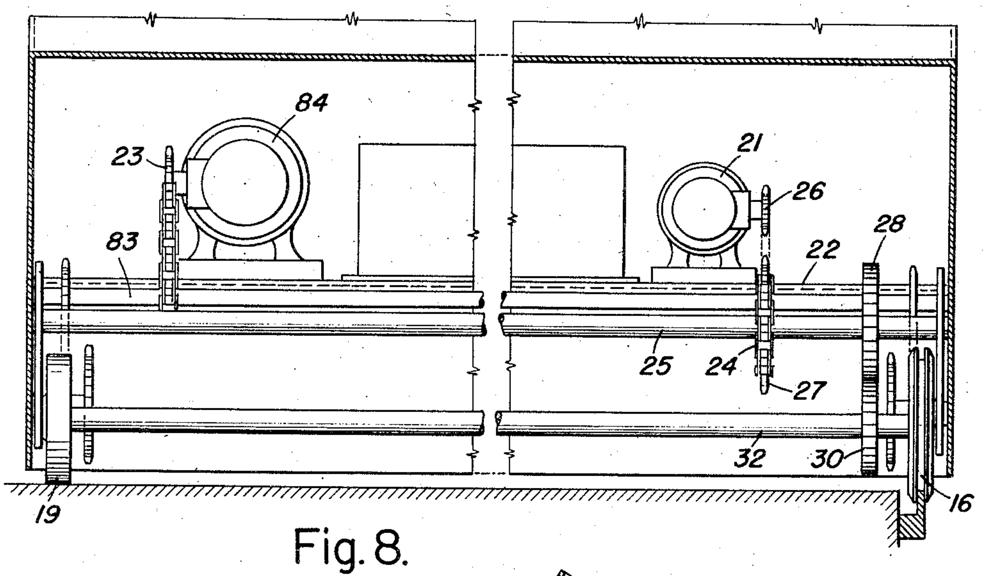
Fig. 8 is a transverse section taken at the forward portion of the carriage and further illustrating the driving means for the carriage and for the lateral chains which control the movement of the pressure members.

Now referring to Figs. 4, 5, and 8 in addition to those already mentioned, the carriage and attendant mechanism are caused to progress along the length of the supporting table by means of a driving motor 21 mounted at the left-hand side of the carriage and upon a transverse supporting beam 22, this motor having a reduction gear mechanism 23 integral therewith and from which a drive is taken through the chain 24 to a cross-shaft 25. The chain engages a sprocket 26 at the motor end and a second sprocket 27 on the shaft 25. As shown more clearly in the transverse section of Fig. 8, the shaft 25 has mounted at one end gear 28 which meshes with a corresponding gear 30, the latter being fixed to a cross shaft 32 to which the rollers 16 and 19, respectively, are fixedly attached. The ends of shaft 32 are carried in the ends of the horizontal arms 33 of bell cranks 34.

In the position shown in Figs. 4 and 8, the carriage is in lowered position or that position which it occupies as it traverses the length of the table to expose the sensitized material. For the return movement, the entire carriage and attendant mechanism are lifted clear of the supporting table and printing material thereon except, of course, for the rollers 16, 17, 19 and 20. As illustrated in Figs. 1, 4, 6, and 9, each of the rollers is carried adjacent one end of a bell crank lever 34 which is in turn pivoted at 35. Each of these levers is controlled by mechanism more clearly illustrated in Fig. 1 to swing about its pivot and thereby to elevate the entire carriage mechanism from the position of Figs. 1, 4, and 6 to that of Fig. 9. A plurality of connecting links 36 and 37, one for each of the said bell crank levers, are attached or pivoted in pairs at their opposite or innermost ends to short two-armed levers 38 pivoted on a cross shaft 39 adjacent the side of the carriage.

These links 36, etc., are slotted as at 40 to engage the pivot 41 at the more or less vertical arm of the bell crank lever, this slot serving to permit a slight amount of overtravel for the links in returning the carriage to lowermost position. At that lowermost position, the bell crank levers are positively stopped by a stop pin or other abutment 42, these stop pins preferably being adjustable as to their position so that when the carriage is lowered, each of the supporting rollers will sustain an equal portion of the load.

To lift the carriage, the two-armed lever 38 is rotated about pivot 39 by a driving sprocket or pulley 43 rotated by a motor 44 supported at the side of the carriage and having a small sprocket or pulley 45 which drives the larger through a chain or belt 46. Preferably, the motor 44 effects movement of the parts driven thereby through considerable speed reduction and the lever 38 and its driving member 43 are controlled to move only in approximately 180° of an arc. Limit switches 47 and 48 are controlled by a pin 49 projecting from the driving sprocket or pulley 43 and, as will be described in greater detail with respect to Fig. 22, these stop the motor 44 which is capable of being rotated in either direction selectively, as the mechanism reaches its raised position or as it reaches the lowermost position as the case may be.

Figure 6:
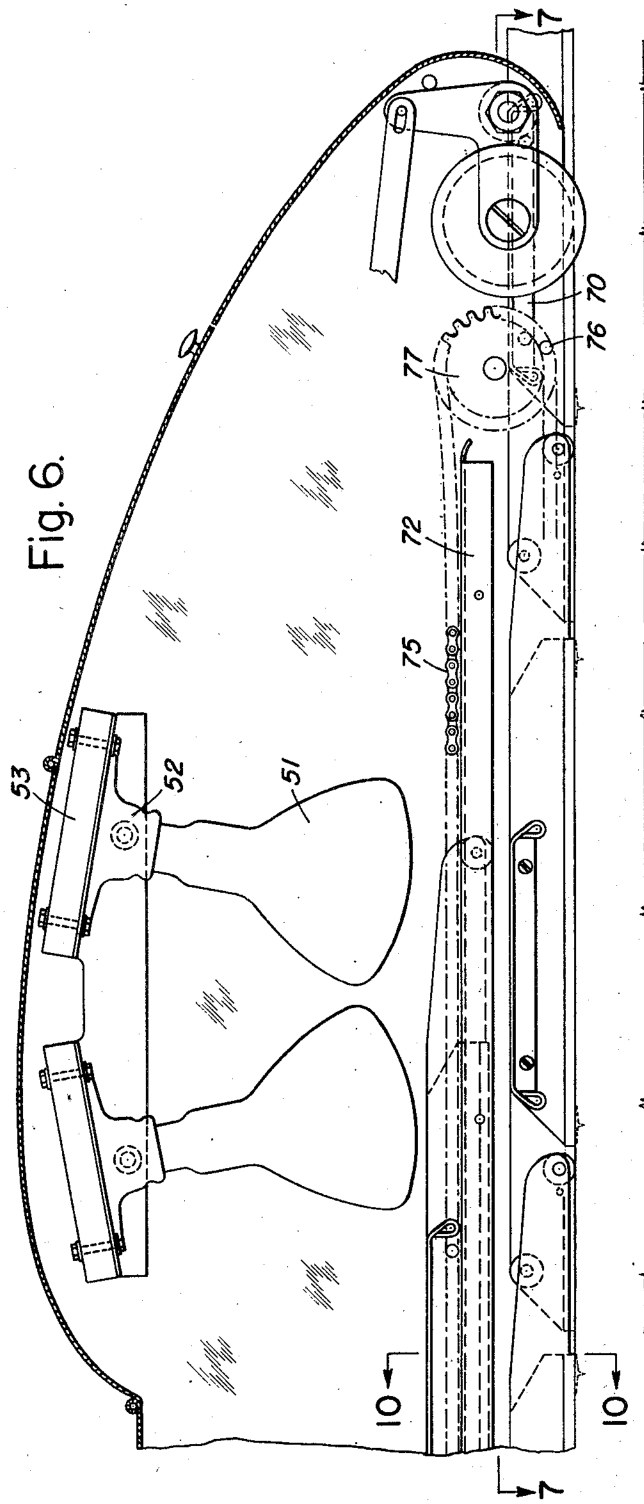
Fig. 6 is a section at the rear part of the carriage similar to the section of Fig. 4.

As shown in Fig. 6, a plurality of lamps 51 are supported within appropriate sockets 52 carried by transverse beams 53 which extend along the topmost portion of the carriage. Two banks of lamps are shown here, but it is to be understood that a single bank of lamps or any plurality thereof may be employed. Preferably, the lamps are staggered in each bank and, therefore, the illumination falling at the printing plane is more evenly distributed. While any suitable type of lamp may be employed, ultraviolet sun lamps are preferably used for diazo-coated material, since they possess the actinic light value and require no cooling. By using a reasonable number of such lamps relatively high light intensity is provided. In practice, fifteen of these lamps consuming approximately 4000 watts gave sufficient illumination to achieve printing speeds of four or five feet per minute.

Current is preferably supplied to the lamps and to the various driving members or motors movable with the carriage through current carrying wires or strips 54 and 55, Fig. 3, these current carrying strips being mounted on an appropriate insulting backing 56 at the side of the supporting table and preferably beneath the guide rail or flange 18. For safety, current carrying strips and other live parts are partially enclosed by casing members 57 and 58. A conduit 59 extends out from the side member 14 of the carriage and projects down toward the current carrying strips to project through the opening between casing members 57 and 58. The strips 54 and 54 are engaged by contact pieces or trolleys 60 and 61, these being electrically connected to conductors running up through the conduit 59 to enter the interior of the carriage casing from which point current is conducted to the various electrical devices in a manner illustrated in Fig. 22 and the details of which will be described hereinafter. The conduit 59 is angularly disposed and pivoted at the casing 14 to provide for movement when the carriage is raised.

A plurality of pressure members are provided for maintaining the original material to be printed and the sensitized sheet flattened against the supporting table and in contact during the time for which they are subjected to the printing light. These pressure members are shown in Figs. 1, 2, 4–7, and 12. It is necessary to have a sufficient number of pressure members so that there will always be at least one in contact with the original and sensitized material at all times and over at least the area illuminated at any particular time by the light source. In the example shown here, four pressure members are employed although it is to be understood that if made of sufficient length and properly manipulated, three may suffice. More than four may be employed in certain instances.

Figure 12:
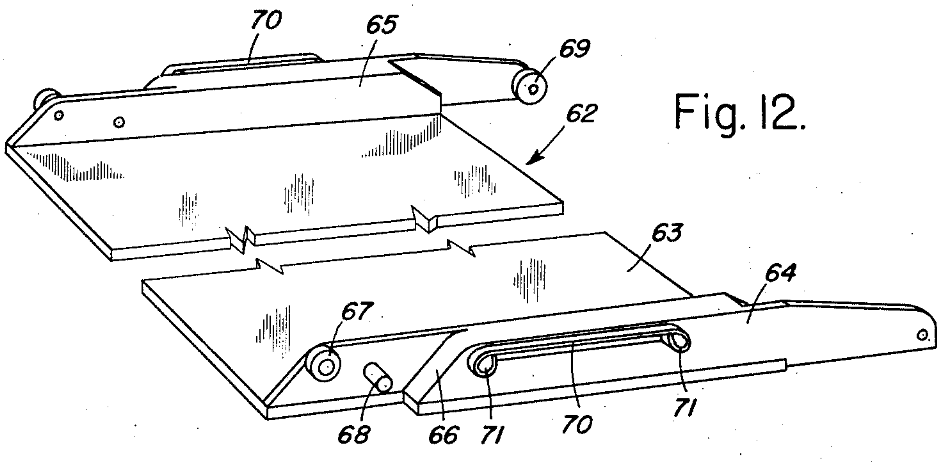
Fig. 12 is a perspective view of one pressure member.

Referring to Fig. 12, the preferred form of such members is illustrated. The complete member is generally designated by numeral 62 comprising a flat transparent or translucent plate 63 which is preferably of shatter-proof glass sufficiently thick to give the requisite physical strength. These pressure members need not have any unusual amount of resistance to distortion or to rough handling since they are manipulated relatively slowly and press downwardly against the printing material with a force equal to their own weight only.

The plate glass 63 or other equivalent material such as plastic, should be of the type to transmit a large proportion of the violet and ultraviolet light incident thereon. These translucent members 63 are highly polished and have all their edges ground thereby to avoid strain in the glass itself and to prevent cracking and undesirable optical effects as the printing light passes the front or rear edges of the glass members during the movement of the carriage. As illustrated in Fig. 2, there is a clearance between each pressure member which may vary depending upon the purpose to which the device is put. These clearances may be relatively small in certain instances where patterns form an integral part of the pressure members themselves, but where relatively large patterns previously laid upon the sensitized material on the table are to be printed, the clearance need not approach particularly small limits.

The transparent plate 63 is attached at its lateral edges to side members 64 and 65 which are formed as illustrated in Fig. 12. These side members may be of wood or metal, for example, cast aluminum or magnesium. The transparent plate may be adhered to the side member by suitable cement or may be attached in any other convenient manner. Toward their forward ends, these side members are so shaped as to provide a downwardly inclined surface 66 and have rollers or other bearings 67 freely pivoted adjacent the forward ends of the members which are of reduced thickness. They also carry projecting pins 68, the purpose of which will be described presently. At the rear ends of the side members, these also being of reduced thickness, but disposed at the outer edges rather than at the inner, are carried corresponding, freely rotatable rollers 69. These rollers 67 and 69 function in the raising and lowering or setting down of the pressure members.

Each side member also has attached thereto a lifting bracket 70 which has at each end a curved stop and bearing lug 71.

Figure 10:
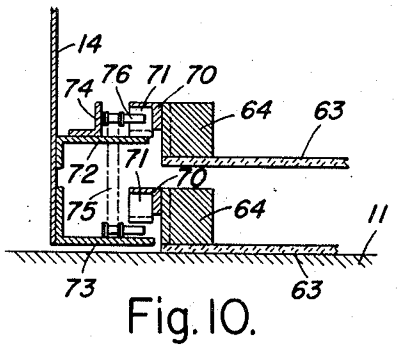
Fig. 10 is a section taken along the side of the carriage at line 10—10, Fig. 6, showing the position of certain parts when the carriage is in lowermost position during the printing traverse.
Figure 9:
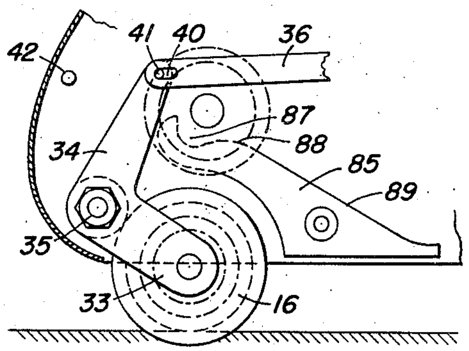
Fig. 9 is a detail view of certain mechanism at the forward portion of the carriage incidental to raising it preparatory to returning it to the initial end of the supporting table.

As shown in Figs. 4, 5, 10, and 11, the side members 14 have attached thereto horizontally disposed guide plates 72 and 73. The guide plate 72 also mounts a vertically disposed guide plate 74. The plate 72 in combination with the cooperating guide plate 74, maintains laterally disposed pressure member changing chains 75 in proper position to effect their intended function, while the guide plate 72 also supports the pressure members as they are moved from the rearmost to the front position. These pressure members as shown in Fig. 10 are moved along the horizontal guide plates 72 being supported thereon by contact between the lugs 71 and the top surface of the plate.

Figure 11:
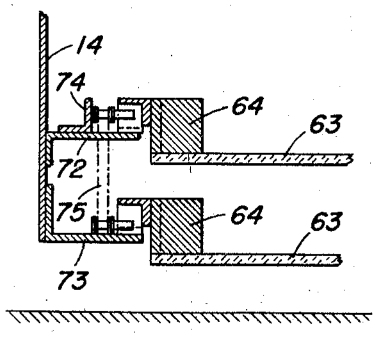
Fig. 11 is a view similar to Fig. 10 but showing parts elevated for the return movement.

The lowermost horizontal plates 73 serve, when the carriage is elevated, as previously described, to raise the pressure members which may at that time be bearing on the printing material or on the supporting surface 11. As the carriage is elevated, the plates 73 engage beneath the lugs 71 on all the pressure members not carried by the top plate 72 and lift them as shown in Fig. 11.

The chains 75 are provided with a plurality of inwardly extending pins 76 which are adapted to engage beneath the lifting brackets 70 and to raise the forward ends of the pressure members so that the rollers 67 will engage upon the rearmost ends of the plates 72. This further movement of the chains and pins 76 carried thereby results in dragging the pressure members forwardly along the supporting plates until the chains are stopped with the pressure members about in mid-position. There are three pairs of these pins 76 and the pairs are spaced as illustrated in Fig. 4 so that they engage between the bearing lugs 71 of the lifting brackets. There will always be one less pair of these pins than there are pressure members.

As shown in Figs. 4–8, the chains 75 duplicated at either side of the machine, pass about the rear sprockets 77 which are freely rotatable on pivots 78 extending inwardly from the casing side members 14 and further, are driven at their forward ends by sprockets 79 likewise freely rotatable upon similar pivots 80. These sprockets 79 are fixed to rotate with small sprockets 81 by which each is directly driven. The small sprockets 81 are in turn driven by more or less vertically disposed chains 82 which extend upwardly to a cross-shaft 83 driven from the motor 84, herein termed a lifting chain driving motor. The motor is interconnected to the shaft 83 by a chain 82' running over the sprockets as shown.

At the forward end of the carriage a mechanism is provided for lowering or "setting down" the pressure members. A notched and inclined cam plate 85 is provided at each side of the carriage. These cam plates are attached to the carriage side members by suitable bolts and are spaced therefrom by the spacing sleeves 86. At the forward ends of these cam members is provided a stop shoulder 87, then just at the base of those shoulders the notch 88, and after the notch, the inclined cam or ramp 89, Fig. 9.

When one of the pressure members is to be lowered into position to engage the printing material, the chain is started and by engagement of the pins 76 with the lugs 71, the said member is slid forwardly along the horizontal plate 72 until the front rollers 67 engage upon the cams 85 and are eventually pushed into the notches 88 stopping against the shoulders 87. This movement brings the forward portion of the particular pressure member to a position where it is supported above the printing material, and makes possible the lowering of the rearmost end of this member as the chain passes about sprockets 79 and the pins 76 disengage the lugs 71. It must be borne in mind that the carriage is continuously moving forward and after the lugs 71 on the lifting brackets have passed by the foremost ends 90 of the plates 72, the rear ends of the side members 64 move down the top surfaces of the corresponding side members on the particular pressure member which is then in front and bearing against the printing material. The rollers 69 then pass down the inclined planes 66 as the entire member is drawn along due to the engagement of the front rollers 67 in the notches 88.

After the rollers 69 have passed down the inclines 66, they engage pins 68 so that they are prevented from rolling forward further, and then the centers of these rollers form a pivot about which the entire pressure member may be lowered in a substantially vertical direction until the plate 63 has engaged and flattened the material to be printed and the sensitized material into contact and into engagement with the supporting surface 11. The rollers 67 and 69 are very free to move and after the rearmost rollers 69 are engaged against the pins 68 of the pressure member which had previously been the foremost, the further movement forward of the carriage merely causes the front rollers 67 of the member positioned to become disengaged from the notches 88 whereupon they are permitted to roll down the inclines 89. As these rollers pass from the inclined surface 89, the pressure member itself will have reached its lowermost position disengaged from the chain 75 and will then be the first of three such members resting on the material to be printed. Of course, the "pick-up" and "setting down" functions are effected substantially simultaneously.

Figure 14:
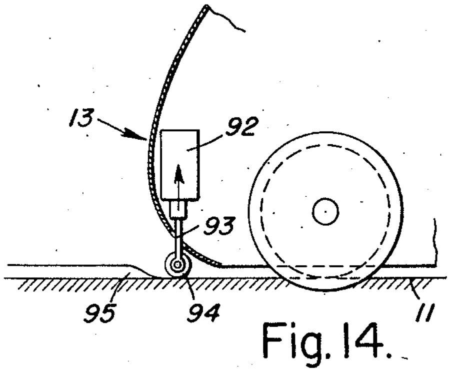
Fig. 14 is a detail showing the stopping switch which is operable when the device has reached the termination of the printing traverse.

The lamps are turned on by a switch located at the side of the carriage, or at any other convenient point and thereafter the carriage may be started by pressing the appropriate one of the buttons at the control panel 91, Fig. 1. Once started, the carriage will continue its movement along the supporting table until stopped intentionally by the operator, or until stopped at the end of the supporting table by a limit switch illustrated in Figs. 14 and 22. As shown in Fig. 14, a switch 92 carried at the front end of the carriage is operated by a plunger 93 projecting through the casing and having a contact member such as roller 94 adjacent the surface of the table 11. At the end of the table a cam 95 or other abutment stands in the way of the roller 94 and when the carriage reaches that point, moves the roller and the plunger upwardly to actuate the switch 92 which in turn shuts off current stopping the entire mechanism although, as will be described hereinafter, certain parts thereof actually come to rest at one particular predetermined point only since it is not desirable to stop the parts and to return the carriage if one of the pressure members happens to be in an intermediate position.

The motor 84 which drives the lateral chains 75 is alternately started and stopped incidental to picking up the rearmost pressure member and the setting down of the front member, there preferably being an idle period during which no movement is imparted to the chain. At that time, three of the members 62 are down while the fourth is in the position of Fig. 4, for example.

Figure 7:
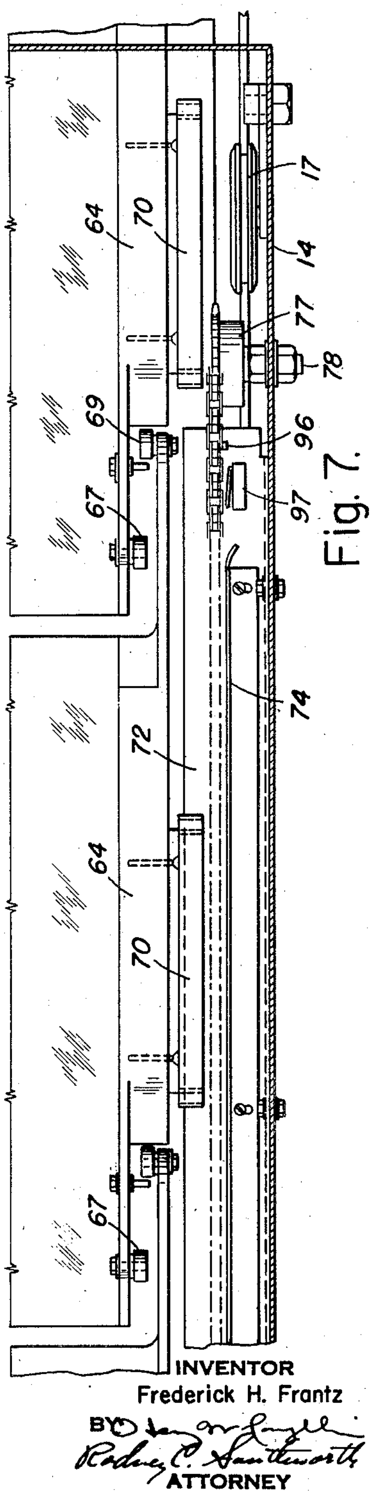
Fig. 7 is a section similar to Fig. 5 but showing those parts of the mechanism at the rear portion of the carriage.

One of the chains, herein the left-hand chain, has three switch contacting buttons thereon, one of which is shown at 96, Fig. 7. These buttons are equally spaced along the length of the chain and must have a particular space relationship to the cooperating pins 76, Figs. 4 and 10, the reasons for which will appear presently. These buttons 96 are adapted to engage a switch 97 which normally is maintained by a spring in such position that the circuit supplying current to the motor 84 is closed. In other words, the motor 84 will function so long as one of the buttons 96 is not touching switch 97.

The spacing of the buttons 97 is such that the motor 84 and the chain are stopped at a point at which we may consider the cycle to start or to end, witness the position of the fourth or inactive pressure member 63 in Fig. 4. At that time, button 96 will have contacted switch 97 breaking the circuit to stop the parts as just above described.

As the chain is stopped when a contact is made between button 96 and switch 97, the leading pin 76 of that pair of pins which is next to function in picking up the rearmost pressure member, will be at a point such that the leading lug 71 of the lifter bracket 70 may pass above that pin so that upon starting the chain, engagement will be made between the pin and the lower side of the lifter bracket. That relationship is illustrated in Fig. 6.

Figure 15:
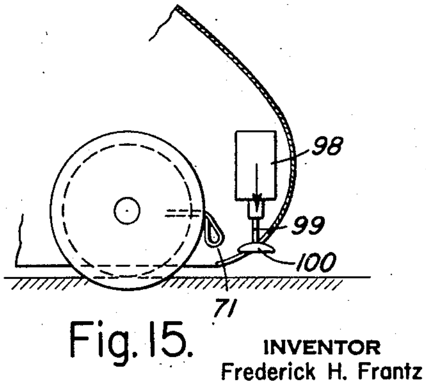
Fig. 15 is a figure similar to Fig. 14, but showing the opposite end of the carriage and a switch member, and the manner in which it is controlled for starting the pick-up cycle for a pressure member.

To start the chain, a separate switch illustrated in Fig. 15 is contacted by the rear lug 71 of the lifter bracket. This switch 98 which has a plunger or arm 99 and a cam contact member 100 is normally open and merely serves upon appropriate movement of the actuating members 99 and 100 to close the circuit for motor 84 just long enough to start that motor thereby advancing the chain so that button 96 will move off the contact piece engaged thereby on switch 97. The situation is one in which the rearmost plate 63, stationary on the printing material, is overtaken by the rear portion of the travelling carriage and switch member 100 eventually moves beneath the lug 71. The switch operated and maintained closed while this lug is passing, completes the circuit to the motor as above described and after the lug 71 has passed, returns to its initial position so that the portion of the circuit energizing the motor 84 is open so far as control by switch 98 is concerned.

After the parts have moved so that the button 96 no longer actuates switch 97, the circuit is closed through the latter and continues in operation until the cycle has been completed and the next button (⅓ of the length of the chain distant) contacts switch 97 thereby to stop the parts at the end of the cycle and in position for the start of the next.

Now referring to Figs. 16–21, one complete cycle has been illustrated and the position of the important parts during six different steps in that cycle will be described. At the first or starting point, the idle pressure member is shown in elevated position and, of course, will have been raised upon the horizontal side plates 72 as previously described and as also illustrated in Fig. 4. The chain at that time is stationary and motor 84 merely remains idle. The other pressure members are free of the travelling carriage and merely lie on the material to be printed as the light source or sources 51 pass above, exposing the sensitized material as desired.

Figures 16, 17, 18, 19, 20, 21:
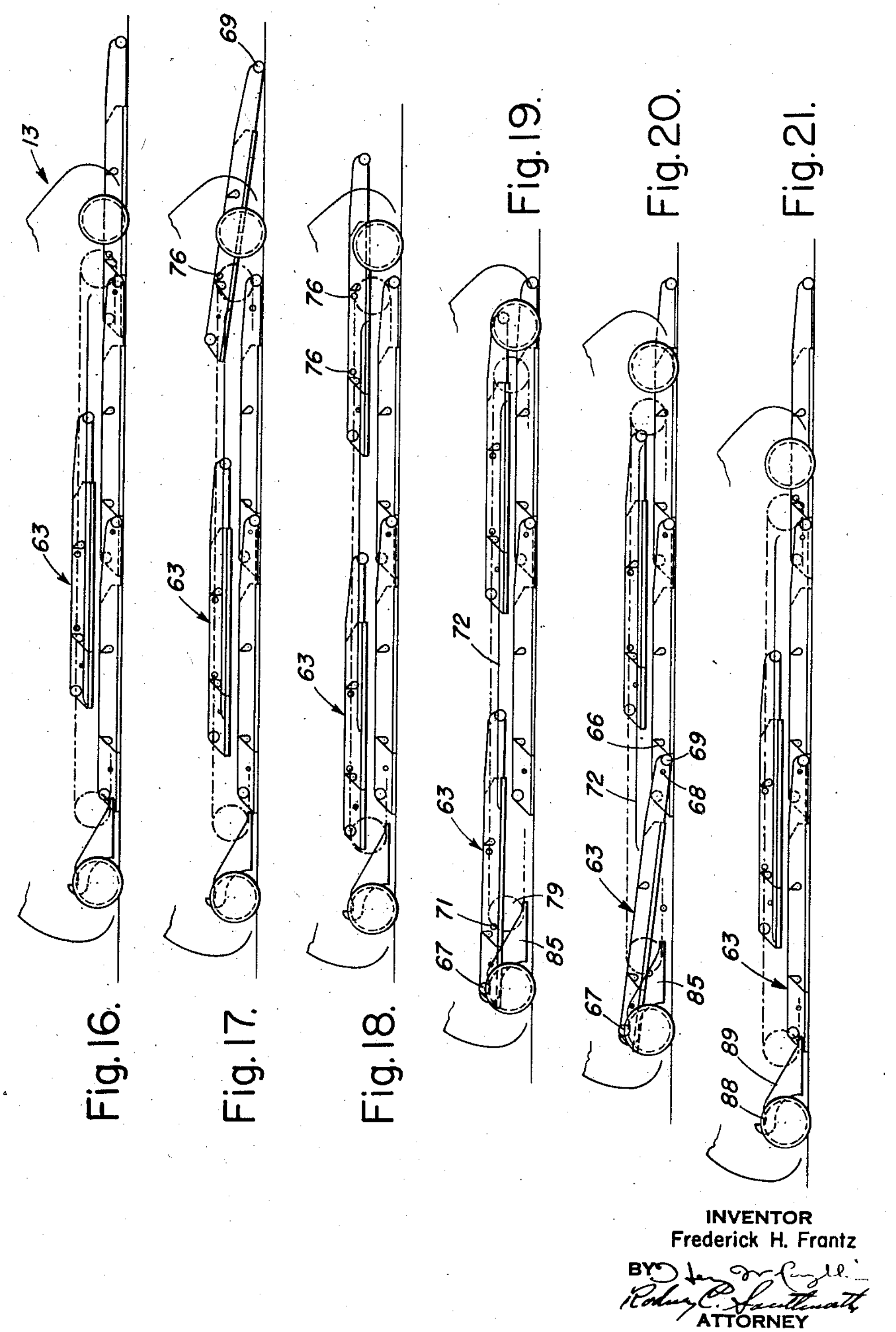
Figs. 16-21 show more or less diagrammatically the relative position of parts which participate in the stepping or advancing movement for the pressure members throughout one complete cycle therefor.

After the motor and chain have been started as previously described, the foremost pin 76 of the pair of pins which are to affect the rearmost pressure members moves beneath the lifting bracket 70 and engages behind the leading lug 71 as shown in both Figs. 16 and 17, to elevate the forward end of that member which then bears on the material to be printed or on the supporting surface 11 by contact of the rollers 69 only. Since the chain is then moving, the pressure member previously elevated is started forwardly and since the chain moves at a rate considerably in excess of the forward speed of the carriage itself, that member rapidly moves toward the front of the carriage. In Fig. 17, it has been advanced considerably although it is still borne upon the horizontal plates 72 and is controlled by the pair of pins which function in raising it and in moving it forward.

Now referring to Fig. 18, the rearmost member has been elevated to horizontal position since the second pin 76 has also engaged beneath the lifting bracket and the forward lug 71 bears against the plate 72. Of course, it is to be understood that this description with respect to Figs. 16–21 is, for simplicity, restricted to parts shown at one side of the mechanism, but duplicate parts functioning in precisely the same manner at the opposite side move synchronously therewith and the actual control and manipulation of the pressure members is equally applied at both sides. After the step shown in Fig. 16, only two pressure members are in contact with the material to be printed but they extend at all times over the area affected by the light sources.

In Fig. 19, the pick-up the rear member is complete and it is positively borne by the horizontal supporting plates 72, but is advanced forwardly toward the so-called neutral position at which the mechanism is periodically and temporarily stopped. The chain has, however, advanced to a point shown in Fig. 19 where the front rollers 67 have entered the notches 88 in the cam members 85. At this time the leading pin 71 is about to disengage the lifting bracket and its end lugs since the chain there passes down beneath the foremost sprocket 79.

Now as seen in Fig. 20, the control previously effected through the pins and the lifting brackets is discontinued and the engagement between the front rollers 67 and the notches 88 serves to move the member 63 forwardly with the carriage until the rearmost rollers 69 have moved down the inclines 66 at the side members of the pressure member previously occupying the front position. The rollers 69 become imprisoned between the lower part of the inclines 66 and the pins 68 and serve as pivot points and as restraining means for the member being lowered so that upon further movement forwardly of the carriage, the front rollers 67 are rolled out of the notches 88 and then pass down the inclined ramps on the cams 85.

At the completion of the movement as shown in Fig. 21, the rollers 67 disengage from the inclined ramp 89 and at this time the cycle has been completed to the extent that three pressure members are again in contact with the material to be printed and the member which was picked up and had previously been the rearmost of the group is not stopped temporarily at the so-called neutral position. The chain is then arrested since one of the buttons 96 will have engaged the switch 97.

Figure 22:
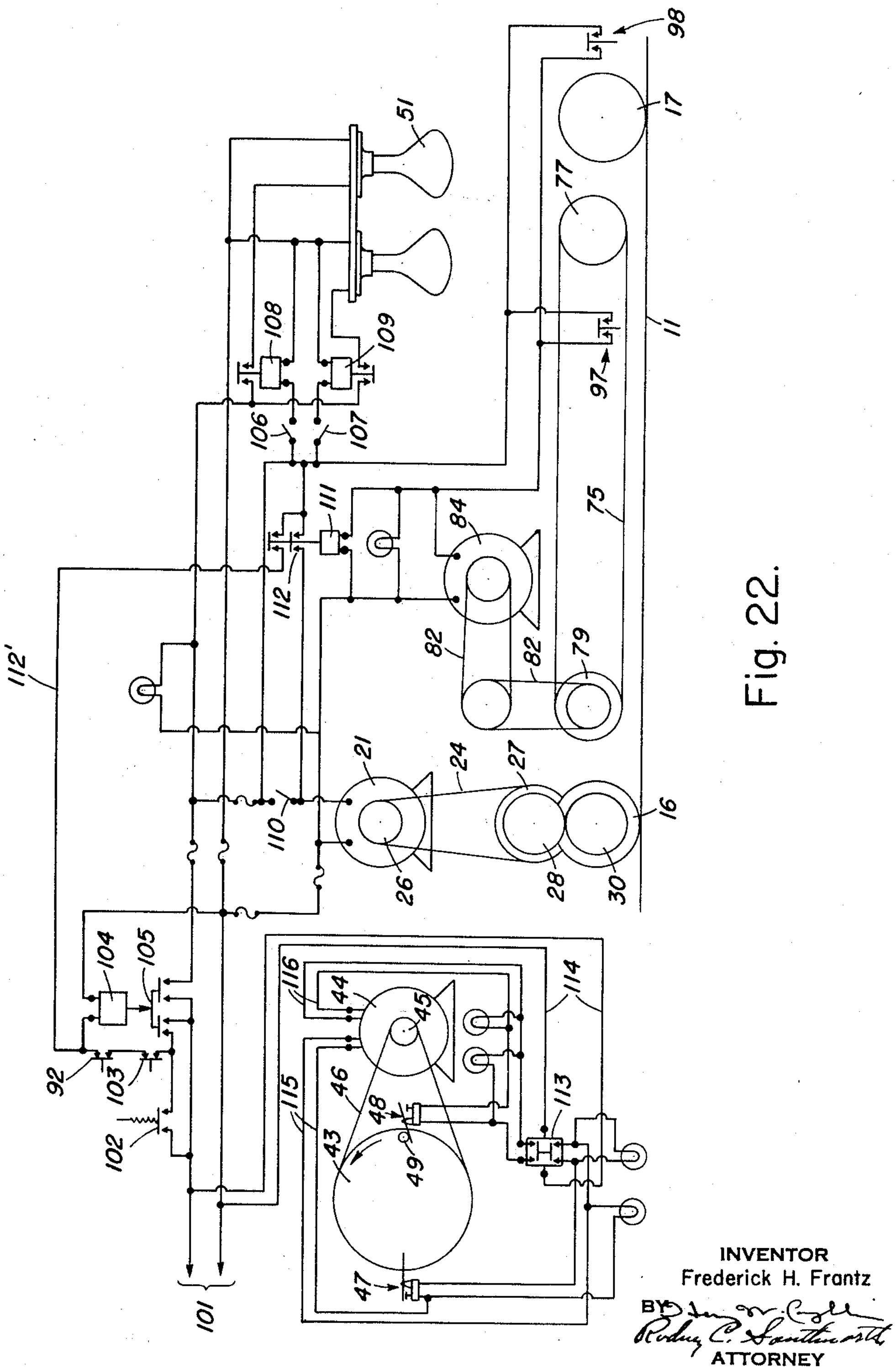
Fig. 22 is a diagrammatic view of the electrical part of the apparatus.

Now referring to Fig. 22, the electrical control system is shown in a single diagrammatic figure. Current is introduced at 101 and may be the usual 110-volt circuit, or any other source of current suitable for the intended purpose. The switch 102 is a starter switch and is normally open. This switch may be closed and then the current is permitted to pass through switches 103 and 92 to the relay 104 thereby energizing this relay which acts to close a double pole switch 105 through which current is permitted to pass so that it will then be possible to light the lamps 51 or to start the carriage mechanism upon actuation of the proper switches. The switch 103 is employed for cutting off all current to the machine and is normally closed. The switch 92 previously mentioned and illustrated in Fig. 14 serves as an automatic limit switch when it is desired to stop the carriage at the end of its travel.

Two switches 106 and 107 may be operated to light the respective banks of lamps which they control. Switch 106 may be closed to light one bank of lamps and functions through the relay 108. Switch 107 operates in a similar manner through relay 109 to light the other bank of lamps.

The carriage and the "picking up" and "laying down" of the pressure members are primarily controlled by switch 110. The latter when closed, starts motor 21 which effectuates the continuous traverse of the carriage from one end of the table to the other and also introduces current to the portion of the circuit feeding the chain motor 84.

If the switch 110 is closed, the switch 98, when contacted by one of the lugs 71, as previously described, permits current to flow through the relay 111 closing the double pole switch 112 so that motor 84 is started. Before the lug 71 ceases to affect switch 98, the chain button 96, Fig. 7, will have passed beyond switch 97 which is normally closed. The switch 98 returns to its normally open position and current is permitted to pass through switch 97 to motor 84 until the next button on the chain causes the circuit to be broken and the lateral chains 75 to be stopped.

The circuit as shown makes it possible to stop only at the neutral position. A trunk line 112′ connects through solenoid 111 back to the solenoid 104, but only through one of the switches 97 or 98. This line keeps solenoid 104 energized until chain lug 96 breaks the circuit by its contact with switch 97. Of course, at that time the parts are in neutral position.

Either or both switch 92 or 103 may be opened without affecting solenoid 104 or switch 105 since the said line 112′ carries current to the solenoid as above described. Thus, whenever the machine is stopped at a designated stop near the end of the table or by either switch 92 or 103, it will continue on until the neutral point is reached at which it is then in position to raise the carriage and to return it to initial position.

Switch 110 may be used to stop the carriage at any point and will function without regard for the position of either of switches 97 or 98.

At the left-hand end of Fig. 22, the circuit incidental to lifting the carriage and returning it to normal position is shown and includes a double pole, double throw switch 113 to which current is supplied by conductors 114 connected to the common source of energy. The motor 44 is reversible and is caused to run in one direction when current is fed through the conductors 115 and in the opposite direction if current passes through conductors 116. Each of these separate feed lines has one of the microswitches 47 and 48 in series therewith. Depending upon which one of these switches is closed, the motor may be started by throwing switch 118 in the proper direction.

According to the particular situation illustrated, microswitch 47 is closed and permits the motor to rotate the sprocket 43 counterclockwise when the switch 113 is moved to contact the lower points and thereby permit the current to flow through the lines 115. The carriage will then be elevated, 180° of revolution for the parts being sufficient for that purpose. At the conclusion of the 180° travel, or whatever travel is necessary, the pin 49 will then contact microswitch 47 thereby breaking the circuit and stopping the motor 44. Of course, after the pin 49 has left its initial position, the microswitch 48 automatically closes.

The parts remain in the elevated position until the operator desires to lower them, usually after having returned the carriage to the starting end of the table, and for that purpose moves switch 113 upwardly to contact the top points and to close the circuit through the conductors 116. Microswitch 48 being closed at this time, movement of switch 113 determines the movement of the parts and, accordingly, the return movement of 180° will then bring the carriage back to the position illustrated.

Figure 13:
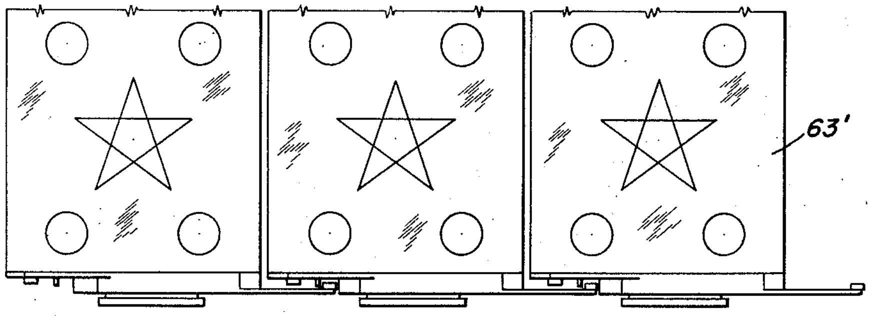
Fig. 13 shows in plan three pressure members having a repeating pattern comprised as an integral part thereof.

Now referring to Fig. 13, one modification of the invention will be described in which the pattern or design to be printed forms a part of the pressure members themselves. The glass or other transparent material may have a design produced thereon by etching, by adhering thereto an opaque or semi-opaque pattern, or the glass itself may have therein an image produced by a photographic process. The image may be of a type involving half-tones as well as those of a single contrasting density.

Preferably, the pattern is on the lower side of the glass.

The machine is otherwise unchanged except for the fact that the speed of the chain movement as compared to the traverse of the carriage must provide for picking up the pressure members and advancing them to neutral position quickly enough so that the image ultimately to appear on the sensitized layer is not materially affected thereby. The neutral position is far enough forward so that light effective on the sensitized layer does not pass through the pressure member in that position.

While the drive from the motors to the carriage supporting and advancing rollers and to the lateral chains has been described as being conveyed through chains and certain gearing, it is to be understood that other appropriate means may be substituted, for example, V-belts, worm gearing, or any other satisfactory mechanism for imparting the power from the motors to the parts involved. The actual construction may be varied widely without departing from the inventive concept.

I claim:

1. A light printing machine having in combination, a support for an elongated sheet of sensitized printing material and a carriage, said carriage having light means for illuminating the sensitized material carried by said support as modified by an original the pattern of which is to be reproduced on the sensitized material, means for moving said carriage along the support at a uniform rate comprising rollers upon which said carriage is supported, said rollers being pivoted at movable lifting means attached to the carriage, means for displacing said lifting means to raise the carriage, a source of motive power for at least one of said pivoted rollers and interconnecting drive means between said source of power and roller, said interconnecting drive means being disconnectable upon lifting the carriage, and means for maintaining the sensitized material flattened against the support, and the original to be printed flat and in contact with the sensitized material at that area at which said light means is effective, which comprises a plurality of movable, flat, translucent pressure members operatively associated with the carriage and means for advancing said pressure members in substantial synchronism with the movement of the carriage relatively to the sensitized material support by periodically moving the rearmost pressure member to a position in front of the foremost member.

2. A light printing machine having in combination, a flat support for an elongated sheet of sensitized printing material and a carriage, said carriage having light means for illuminating the sensitized material carried by said support as modified by an original, the pattern of which is to be reproduced on the sensitized material, bell crank levers pivoted adjacent the lateral sides of said carriage and rollers carried by one arm of each of said brell crank levers, said rollers being adapted to support the carriage and to permit it to traverse lengthwise of the flat support, a motor and means interconnecting said motor and the other arms of said bell crank levers for swinging them about their pivots thereby to elevate the carriage, drive means for at least one of said carriage supporting rollers including gears, one of which is driven from the motor and the other of which is attached for driving said roller, said gears being disposed in meshing engagement when the carriage is in lowered position but being disengageable upon swinging the said bell crank levers for elevating the carriage and means for maintaining the sensitized material flattened against the support, and the original to be printed flat and in contact with the sensitized material at that area at which said light means is effective, which comprises a plurality of movable, flat, translucent pressure members operatively associated with the carriage and means for advancing said pressure members in substantial synchronism with the movement of the carriage relatively to the sensitized material support by periodically moving the rearmost pressure member to a position in front of the foremost member, and guide plates projecting internally of the lateral sides of said carriage and engageable beneath a portion of said pressure members for lifting them from the material to be printed as said carriage is elevated.

3. A light printing machine as defined in claim 2, wherein said motor for elevating the carriage is reversible and in which means is provided for controlling said motor comprising a reversing switch and microswitches, and means which includes a movable part on said elevating means engageable with said microswitches for stopping the carriage at either of its extreme positions.

4. A light printing machine having in combination, a flat support for an elongated sheet of sensitized printing material and a carriage, said carriage having light means for illuminating the sensitized material carried by said support as modified by an orignial, the pattern of which is to be reproduced on the sensitized material, means for moving said carriage along the support at a uniform rate, and means for maintaining the sensitized material flattened against the support, and the original to be printed flat and in contact with the sensitized material at that area at which said light means is effective, which comprises a plurality of movable, flat, translucent pressure members operatively associated with the carriage, moving chains positioned along the sides of the carriage, said translucent pressure members comprising a relatively transparent flat plate and side members to which are attached lifting brackets, projecting pins spaced along said chains and disposed for engagement with said lifting brackets, guide means for said chains and guide plates extending partially along the length of said carriage and at a height above those pressure members bearing upon said printing material, for supporting a pressure member as it is moved from rearmost to foremost position, and projections from the chains which engage the lifting brackets of a pressure member for raising that pressure member from a position rearmost of the group, move it forward along the carriage and then lower it into position in front of the foremost member heretofore bearing against the sensitized material and originals to be printed.

5. A light printing machine as defined in claim 4 further characterized by the provision of switches for affecting the circuit of that motor which periodically advances the said lateral chains, one said switch being normally closed and the other normally open, said switch which is normally closed being positioned for engagement by lugs carried by one of the chains for opening the switch thereby to break the circuit and stop the motor and chains at predetermined positions, the other of said switches being so positioned on said carriage and relatively to the pressure members as to be contacted by a portion of the rearmost one of said pressure members thereby to close that switch and start the chain advancing motor, said switch being operable until the projection from the chain has moved off and normally closed switch after which said chains are driven until the next following projection contacts that switch and again breaks the circuit.

6. A light printing machine having in combination, a flat support for an elongated sheet of sensitized printing material and a carriage, said carriage having light means for illuminating the sensitized material carried by said support as modified by an original, the pattern of which is to be reproduced on the sensitized material, means for moving said carriage along the support at a uniform rate, and means for maintaining the sensitized material flattened against the support and the original to be printed flat and in contact with the sensitized material at that area at which said light means is effective, which comprises a plurality of movable, flat, translucent pressure members operatively associated with the carriage and means comprising moving chains positioned along the sides of the carriage and engageable with projections from said pressure members for advancing said members in substantial synchronism with the movement of the carriage along the support by periodically raising the rearmost pressure member, moving it forward to a position above and slightly in advance of the pressure member then in foremost position and lying upon the material to be printed, and means for lowering said pressure member into position on the material to be printed by first dropping the rear end of the said pressure member into contact with the flat support and thereafter, while holding the said rear end of the member substantially stationary, causing the front end of the member to be moved downwardly into contact with the said material to be printed.

7. Mechanism as defined in claim 6, wherein the said means for lowering the pressure member into position above the material to be printed includes cam members having notches for the reception of the front ends of the pressure member, downwardly inclined ramps along which the said front ends of the pressure member slide, and means at the forward end of the pressure member previously occupying the front position along which the rear ends of the said member move to position against the material to be printed and for retaining the said member against forward movement after its rearmost end has moved into engagement with the flat support for the sensitized printing material.

8. Mechanism as defined in claim 6, in which each said pressure member comprises a flat, transparent plate, side members to which said plate is attached, lifting brackets attached to each said side member, rollers at the rearmost ends of said side members and other rollers at the front ends of said side members, each said side member further having a downwardly and forwardly inclined surface along which those rollers at the rearmost ends of a pressure member about to be lowered into contact with the printing material may move, projecting lugs engageable with said rollers after they have moved into engagement with the flat support for the sensitized material for preventing further forward movement of that pressure member, and means for controlling the front end of the member comprising cam members having notches adjacent their top surfaces and an inclined ramp extending from each notch downwardly toward the said flat support, said pressure member being so controlled by the lateral chains as to have the rollers at the front ends of the side members moved into the said notches whereupon the member is then moved along by the carriage until the rollers at the rear of the said side members are moved down to engage the flat support.

9. A light printing machine having in combination, a support for an elongated sheet of sensitized printing material and a carriage, said carriage having light means for illuminating the sensitized material carried by said support as modified by an original the pattern of which is to be reproduced on the sensitized material, means effecting a relative progressive movement between the carriage and support, and means for maintaining the sensitized material flattened against the support and the original, the pattern of which is to be printed, flat and in contact with the sensitized material at that area at which said light means is effective, which comprises a plurality of movable, flat, translucent pressure members operatively associated with the carriage and means for advancing said pressure members in substantial synchronism with the movement of the carriage relatively to the sensitized material support by periodically moving the rearmost pressure member to a position in front of the foremost member, and means for stopping said carriage and pressure member moving means, said stopping means comprising relays the first of which is supplied with current from a source and also through said other relay, a switch controlled by the first relay for passing current to the operating parts of said machine and to said second relay, means operable by said pressure member advancing means for cutting off current from said second relay only when the members being moved have reached a predetermined position, a switch for cutting off current from the supply directly to said first relay, and a conductor for supplying current from said second relay circuit to the first relay until the second relay is deenergized.

10. Mechanism as defined in claim 9, wherein said stopping means includes a current controlling switch for opening the circuit to said first relay and an abutment adjacent the end of the support for the sensitized material for actuating said switch.

11. Printing apparatus for light sensitive printing material having in combination an elongated support for the sensitized material, a carriage movable over said support including means for illuminating said material as modified by originals placed thereon, means for effecting a progressive movement of said carriage over said support and means for maintaining firm contact between said originals and said material, as well as between said material and said support at the area where said illuminating means is effective, comprising a plurality of sequentially movable, flat, translucent pressure members operatively associated with the carriage, means for advancing said pressure members simultaneously with the movement of said carriage, and means for successively placing each of said members over said material.

12. Printing apparatus for light sensitive printing material having in combination, an elongated support for the sensitized material, a carriage movable over said support including means for illuminating said material as modified by originals placed thereon, means for effecting a progressive movement of said carriage over said support and means for maintaining firm contact between said originals and said material, as well as between said material and said support at the area where said illuminating means is effective, comprising a plurality of sequentially movable, flat, translucent pressure members operatively associated with the carriage, means for advancing said pressure members simultaneously with the movement of said carriage, and means for successively placing each of said members over said material, the rearmost pressure member being placed at a position in front of the foremost member in the sequential movement of said members.

13. Printing apparatus for light sensitive printing material having in combination, an elongated support for the sensitized material, a carriage movable over said support including means for illuminating said material as modified by originals placed thereon, means for effecting a progressive movement of said carriage over said support at a substantially uniform rate, and means for maintaining firm contact between said originals and said material, as well as between said material and said support at the area where said illuminating means is effective, comprising a plurality of sequentially movable, flat, translucent pressure members operatively associated with the carriage, means for advancing said pressure members simultaneously with the movement of said carriage, including means for lifting the rearmost member over the other of said members and moving it forwardly and lowering it into position in front of the foremost member theretofore resting on said material and means for releasing said lifted member from said operative association, whereby each of said members is placed in succession over said material.

14. Printing apparatus for light sensitive printing material having in combination, an elongated support for the sensitized material, a carriage movable over said support including means for illuminating said material as modified by originals placed thereon, means for effecting a progressive movement of said carriage over said support at a substantially uniform rate, and means for maintaining firm contact between said originals and said material, as well as between said material and said support at the area where said illuminating means is effective, comprising a plurality of sequentially movable, flat, translucent pressure members operatively associated with the carriage, means for advancing said pressure members simultaneously with the movement of said carriage, comprising moving chains positioned along the sides of the carriage and engageable with projections of said members for lifting the rearmost member over the other of said members and moving it forwardly and lowering it into position in front of the foremost member theretofore resting on said material, and means for releasing said lifted member from said operative association, whereby each of said members is placed in succession over said material.

15. Printing apparatus for light sensitive printing material having in combination, an elongated support for the sensitized material, a carriage movable over said support including means for illuminating said material as modified by originals placed thereon, means for effecting a progressive movement of said carriage over said support at a substantially uniform rate, and means for maintaining firm contact between said originals and said material, as well as between said material and said support at the area where said illuminating means is effective, comprising a plurality of sequentially movable, flat translucent pressure members operatively associated with the carriage, and means for advancing said pressure members in substantial synchronism with the movement of the carriage along the sensitized material including chains operatively supported at the lateral sides of the carriage, said chains having means projecting therefrom, cooperating projections at the sides of said pressure members disposed for engagement with said means projecting from the chains and power means for advancing the chains periodically to effect engagement of the said means thereby to raise the rearmost pressure member, to advance it forwardly of the carriage, and to lower it into position in advance of the member which theretofore occupied the front position.

16. Printing apparatus for light sensitive printing material, particularly for repeated printing thereof of a plurality of selected patterns comprising in combination an elongated support for the sensitized material, a carriage bearing a light source adapted to illuminate said material, means for effecting progressive movement of said carriage over said material, and means for placing the patterns to be printed between the said light source and over said material in successive order, said patterns comprising a plurality of movable, flat, translucent plate members bearing the design to be reproduced.

17. Printing apparatus for light sensitive printing material, particularly for repeated printing thereon of a plurality of selected patterns comprising in combination an elongated support for the sensitized material, a carriage bearing a light source adapted to illuminate said material, means for effecting progressive movement of said carriage over said material, and means for placing the patterns to be printed between said light source and over said material in successive order, said patterns comprising a plurality of sequentially movable, flat, translucent plate members operatively associated with said carriage and bearing the design to be reproduced, said means for placing the pattern including lifting means for the rearmost member and lowering means for releasing the latter onto said material in front of the foremost member in the sequential movement of said members.

FREDERICK H. FRANTZ.

REFERENCES CITED

The following references are of record in the file of this patent:

UNITED STATES PATENTS

| Number | Name | Date |
|---|---|---|
| 478,663 | Urie | July 12, 1893 |
| 846,767 | Webster | Mar. 12, 1907 |
| 1,093,509 | Weidner | Apr. 14, 1914 |
| 1,251,076 | Thauch | Dec. 25, 1917 |
| 1,383,353 | Wagenhorst | July 5, 1921 |
| 1,414,582 | Roth | May 2, 1922 |
| 1,417,403 | Moninger | May 23, 1922 |
| 1,471,672 | Wehrli | Oct. 23, 1923 |
| 2,427,923 | Reynolds | Sept. 23, 1947 |

FOREIGN PATENTS

| Number | Country | Date |
|---|---|---|
| 408,927 | Great Britain | July 14, 1932 |
| 744,689 | France | Jan. 26, 1933 |